(12) United States Patent
Leppard

(10) Patent No.: US 8,984,024 B2
(45) Date of Patent: *Mar. 17, 2015

(54) MANIPULATING THE ACTUAL OR EFFECTIVE WINDOW SIZE IN A DATA-DEPENDANT VARIABLE-LENGTH SUB-BLOCK PARSER

(71) Applicant: Quantum Corporation, San Jose, CA (US)

(72) Inventor: Andrew Leppard, Adelaide (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,319

(22) Filed: Oct. 28, 2013

(65) Prior Publication Data

US 2014/0122449 A1     May 1, 2014

Related U.S. Application Data

(63) Continuation of application No. 13/013,398, filed on Jan. 25, 2011, now Pat. No. 8,572,042.

(51) Int. Cl.
*G06F 17/30* (2006.01)
*G06F 17/00* (2006.01)

(52) U.S. Cl.
CPC .... *G06F 17/30943* (2013.01); *G06F 17/30156* (2013.01)
USPC .............................. 707/803; 704/503; 341/51

(58) Field of Classification Search
CPC .............. G06F 11/1453; G06F 3/0641; G06F 17/30159; G06F 3/0608; G06F 3/067; G06F 17/30156; G06F 11/1451; G06F 17/30097; G06F 11/1464; G06F 3/061; G06F 3/0689; G06F 11/2094; G06F 17/30153; G06F 17/30221; G06F 17/30943; G06F 11/1446; G06F 11/14
USPC ........... 707/803; 704/503; 341/51; 375/20.03
IPC ....................................................... G06F 17/30
See application file for complete search history.

(56) References Cited

U.S. PATENT DOCUMENTS

| | | | | |
|---|---|---|---|---|
| 5,990,810 A | * | 11/1999 | Williams | 341/51 |
| 6,377,930 B1 | * | 4/2002 | Chen et al. | 704/503 |
| 7,720,878 B2 | * | 5/2010 | Caldwell et al. | 707/803 |
| 7,889,790 B2 | * | 2/2011 | Sun | 375/240.03 |

* cited by examiner

*Primary Examiner* — Yicun Wu

(57) ABSTRACT

Example systems and methods concern a sub-block parser that is configured with a variable sized window whose size varies as a function of the actual or expected entropy of data to be parsed by the sub-block parser. Example systems and methods also concern a sub-block parser configured to compress a data sequence to be parsed before parsing the data sequence. One example method facilitates either actually changing the window size or effectively changing the window size by manipulating the data before it is parsed. The example method includes selectively reconfiguring a data set to be parsed by a data-dependent parser based, at least in part, on the entropy level of the data set, selectively reconfiguring the data-dependent parser, based, at least in part, on the entropy level of the data set, and parsing the data set.

6 Claims, 5 Drawing Sheets

MANIPULATING THE ACTUAL OR EFFECTIVE WINDOW SIZE IN A DATA-DEPENDANT VARIABLE-LENGTH SUB-BLOCK PARSER

CROSS REFERENCE TO RELATED APPLICATIONS

This application is a continuation of U.S. patent application Ser. No. 13/013,398 filed Jan. 25, 2011.

BACKGROUND

Conventional data-dependent deduplication may employ a window-based parser to identify boundary locations. Conventional window-based parsers are configured as fixed-size window sub-block parsers. Data in the fixed-size window is evaluated to determine whether it satisfies a constraint. When a constraint is satisfied, a boundary is identified in data being parsed. A small, fixed-size window may be efficient for identifying boundaries in certain types of data. For example, a small, fixed-size window can be efficient for processing data with very high entropy (e.g., random data). However, a small, fixed-size window may be inefficient for identifying boundaries in data with low entropy. Entropy is a measure of uncertainty associated with the randomness of data in an object to be data reduced. The entropy of data that is truly random is one. The entropy of a long string of duplicate characters is nearly zero. The entropy of most data falls between these two limiting examples.

The '810 patent (U.S. Pat. No. 5,990,810) describes one example of data-dependent deduplication that may employ a fixed-size window. Claim 1 of the '810 reads, in part:

organizing a block b of digital data . . .
by partitioning the block into subblocks at one or more positions k|k+1 in the block for which b[k−A+1 . . . k+B] satisfies a predetermined constraint,
where A and B are natural numbers.

The notation b[k−A+1 . . . k+B] describes the "window" used by the parser. Data in the window is evaluated to determine whether a constraint is satisfied, which determines whether a boundary will be placed. The '810 patent describes a degenerate case for the window where either A or B is zero. The '810 patent also describes a case where the constraint considers some of the data in a window b[k−A+1 . . . k+B] while ignoring some of the data in the window b[k−A+1 . . . k+B]. By way of illustration, a constraint that only pays attention to, for example, b[k−3] and b[k+2] while ignoring the other characters in the window b[k−A+1 . . . k+B] would fall under the classes of constraint corresponding to A>=4 and B>=2.

In some conventional systems, when the data in the window is high entropy data, then the parser will yield a geometric distribution of sub-block sizes. A truncated geometric distribution of sub-block sizes may be desirable for certain data sets and for certain processing. However, some data sets (e.g., those with low entropy) may not parse with a geometric distribution of sub-block sizes. In some examples, when the entropy is low, the parser may not meet its constraint in a small window. When the parser does not meet its constraint, the parser may only produce maximum length sub-blocks, which effectively degenerates the parser into a fixed length parser.

Smaller window sizes have been favored in some conventional systems. Smaller window sizes provide some advantages. For example, fast boundary check algorithms are relatively easier to generate for small window sizes. The algorithms are relatively easier to generate because they will consider relatively less data when placing a boundary than will be the case for a larger window. The algorithms are also relatively easier to generate because of the history involved in the rolling hash processing associated with evaluating a constraint. For example, a boundary checking algorithm may keep a history of the data currently seen in the window. Performance considerations may dictate that this history data be stored in a hardware register(s). The hardware registers may only be 32-bit or 64-bit, and thus smaller window sizes may be preferred.

BRIEF DESCRIPTON OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
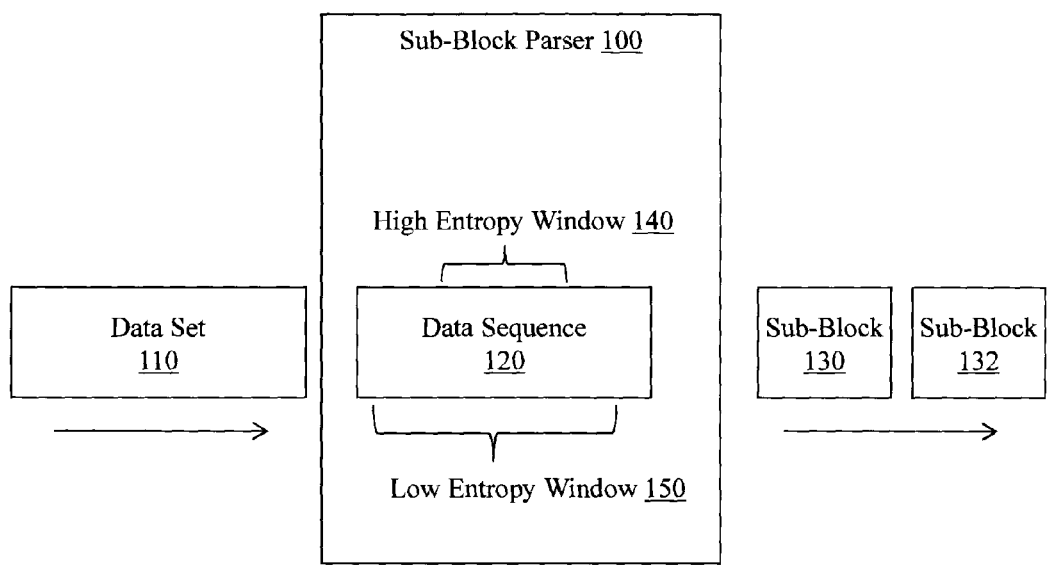
FIG. 1 illustrates a sub-block parser configured with a variable length window.

Example systems and methods may employ a parser that uses a window where the natural numbers A and B associated with the "window" described by b[k−A+1 . . . k+B] can vary. A and B may vary as a function of an attribute of the data being parsed. Thus, the window size may vary depending on the data being parsed. Data entropy is one attribute that can be analyzed to determine values for A and B. Thus, the window size may vary depending on the entropy of data being parsed.

Example systems and methods also describe increasing the information density of data to be parsed before or while parsing that data. In one embodiment, the information density may be increased through compression. In other embodiments, the information density may be increased through data substitutions, and other techniques. In different examples, different compression approaches may be taken.

Thus, example systems and methods may actually change the window size or may effectively change the window size. Effectively changing the window size is achieved by changing the data. In one example, both the actual and effective window size are changed.

Changing either the actual or effective window size facilitates addressing an issue associated with small, fixed-size windows. The issue concerns a small, fixed-size window not being as efficient for data-dependent boundary placement in low entropy data. This issue is illustrated by comparing the parsing of SEQ1 and SEQ2, two representative sequences of data.

Purely random data may create a high entropy sequence like SEQ1:

51 AC 88 2B 92 AB 44 A1 7B 30 18 17 69 D1 95 74 ... SEQ1

If a data-dependent parser used a window size of two bytes, then the data could take one of 65,536 possible values with equal probability. While a window size of two bytes is described for illustrative purposes, one skilled in the art will appreciate that a two byte window size may not be practical. While SEQ1 illustrates high entropy data, SEQ2 illustrates low entropy data.

12 00 00 00 00 00 53 00 00 00 00 A3 00 00 00 00 ... SEQ2

With this data set, a data-dependent parser that used a window size of two bytes would capture one of 256 possible values—with 0 being the most probable. This would significantly reduce the chances of identifying a sub-block boundary in this data. This type of low entropy data may frequently result in maximum length sub-blocks. As described above, a geometric distribution of sub-block sizes may be desirable. If the parsing consistently yields maximum length sub-blocks, then data-dependent parsing has in effect degenerated to fixed length parsing.

Over time, as data-dependent deduplication has been deployed, it has become clear that much real-world data is more similar to SEQ2 than to SEQ1, which makes it likely that the issues associated with low entropy data and small, fixed-size windows will be encountered. So, examine the result on parsing SEQ2 if the window size is increased from two bytes to eight bytes. By increasing the window size, the entropy of data in the parsing window as it rolls over SEQ2 approaches the entropy of data in the parsing window as it rolls over SEQ1.

Thus, being able to manipulate the actual window size (e.g., from 2 bytes to 8 bytes) in response to the entropy of the data being parsed facilitates preserving the desired geometric distribution of sub-block sizes. Therefore example systems and methods concern a sub-block parser configured with a variable sized window, where the window size varies depending on the entropy of the data being parsed. Example systems and methods may first determine the entropy of the data being parsed, may calculate a window size suitable for the entropy, and then may parse the data.

Additionally, since compressing the data to be parsed can change its entropy and thus effectively change the window size without actually changing the window size, example systems and methods may also compress data before or while parsing that data. These improvements over conventional systems facilitate having the parser produce a geometric distribution of sub-block sizes.

In one example, the set of data may be compressed before or during parsing. Consider SEQ2.

| 00 01 02 03 04 05 06 07 08 09 0A 0B 0C 0D 0E 0F ... | Byte# |
| 12 00 00 00 00 00 53 00 00 00 00 A3 00 00 00 00 ... | SEQ2 |

One embodiment may include compressing the data by applying a basic run length coding (RLC) technique. One example RLC technique folds runs of identical data to output a sequence that records the first byte in a run and then the length of the run in bytes:

| 00 01 02 03 04 05 06 07 08 09 0A 0B 0C 0D 0E 0F ... | |
| 12 00 05      53 00 03     A3 00 0x ... | SEQ2-RLC1 |

While a basic RLC algorithm is described, one skilled in the art will appreciate that other techniques may be employed. Examples of these additional and/or alternative techniques are provided below. For example, one embodiment may add the run length to the first repeated byte value or replace the repeated byte with its count:

| 00 01 02 03 04 05 06 07 08 09 0A 0B 0C 0D 0E 0F ... | |
| 12 05          53 03        A3 0x ... | SEQ2-RLC2 |

Another embodiment may add the repeated byte with its count to the previous byte:

| 00 01 02 03 04 05 06 07 08 09 0A 0B 0C 0D 0E 0F ... | |
| 17            56          Ax ... | SEQ2-3 |

Another embodiment may capture the first of the repeated bytes. While this embodiment may not be practical for a two-byte window, it may be practical for longer window lengths.

| 00 01 02 03 04 05 06 07 08 09 0A 0B 0C 0D 0E 0F ... | |
| 01 12 00       53 00        A3 00 ... | SEQ2-4 |

Another embodiment may simply ignore zero bytes.

| 00 01 02 03 04 05 06 07 08 09 0A 0B 0C 0D 0E 0F ... | |
| 12            53          A3 ... | SEQ2-5 |

These compression techniques effectively increase the window size. Even though the compression effectively increases the window size, fast small window parsers may still be employed.

While run length coding based compression has been described above, the data set may be processed in other ways either before or during parsing. For example, in one embodiment, runs of a single byte (or multiple byte blocks e.g. FF 12 FF 12 . . .) may be replaced with an iterative sequence. While runs of a single block are described, multiple byte blocks (e.g., FF 12 FF 12) may similarly be replaced with an iterative sequence. SEQ2-6 illustrates the result of incrementing run bytes:

| 00 01 02 03 04 05 06 07 08 09 0A 0B 0C 0D 0E 0F ... | |
| 12 00 01 02 03 04 53 00 01 02 03 A3 00 01 02 03 ... | SEQ2-6 |

Replacing runs with an iterative sequence facilitates having the parser place a sub-block boundary within a run of byte sequences, not simply at the start or end of the sequence. One skilled in the art will appreciate that the iterative sequence processing may involve, for example, a function or algorithm that generates a deterministic sequence of numbers based on an initial state. Replacing the run of characters with an iterative sequence based on the initial data effectively increases the parser window size.

In one embodiment, the parser can be reconfigured to skip over patterned sequences. The patterned sequences that are skipped can be repeated single byte patterns, repeated multiple byte patterns, deterministic sequences and so on. When the length of a repeated sequence exceeds a threshold, then the repeated sequence can be skipped and the data stored in a different form. For example, the data can be stored in a compacted or descriptive form instead of as raw data.

FIG. 1 illustrates a sub-block parser 100 that is configured with a variable length window. Sub-block parser 100 will accept a data set 110 and produce sub-blocks (e.g., sub-blocks 130, 132, . . . ). Sub-block parser 100 will examine sequences of data (e.g., sequence 120) in data set 110 and determine where boundaries between sub-blocks belong. Sub-block parser 100 will examine sequences using a variable sized window. The size of the variable sized window will vary as a function of the entropy of data set 110 to be parsed by the sub-block parser 100.

FIG. 1 illustrates two different windows. One window is identified as a high entropy window 140 while another window is identified as a low entropy window 150. The high entropy window 140 is illustrated being smaller than the low entropy window 150. While two windows are presented, one skilled in the art will appreciate that in some embodiments the variable sized window may take on more than two sizes. Changing the size of the window in which data are examined to determine whether the data satisfies a constraint facilitates parsing the data set 110 into a set of sub-blocks having a desired distribution of sub-block sizes.

Figure 2:
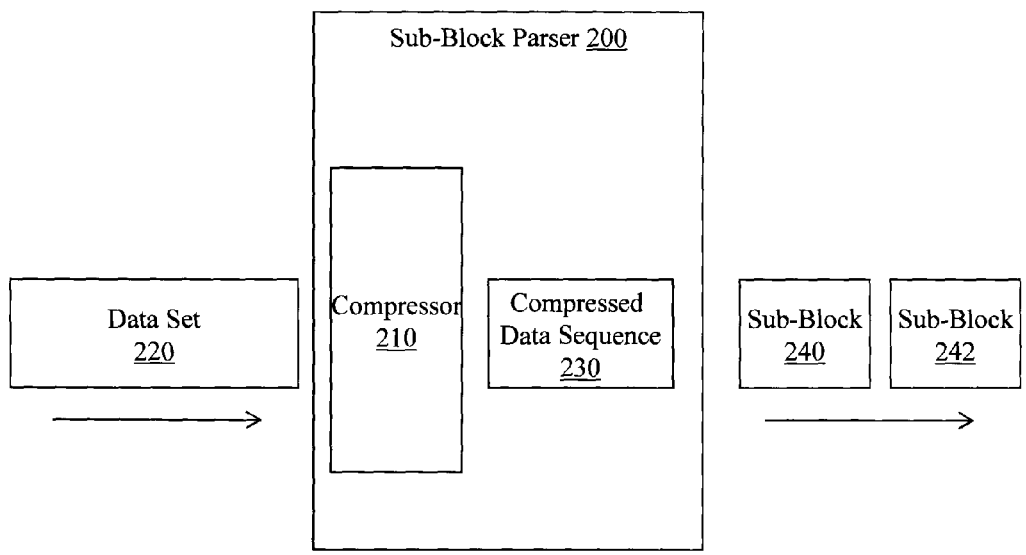
FIG. 2 illustrates a sub-block parser configured with a data compressor.

FIG. 2 illustrates a sub-block parser 200 configured with a data compressor 210. Sub-block parser 200 inputs a data set 220 and outputs sub-blocks (e.g., sub-block 240, sub-block 242, . . . ). However, either before or while parsing the data set 220, compressor 210 compresses the data set 220 into compressed data sequence 230. Compressing the data set 220 into the compressed data sequence 230 facilitates effectively changing the window size used by the sub-block parser 200 without actually changing the window size.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 3:
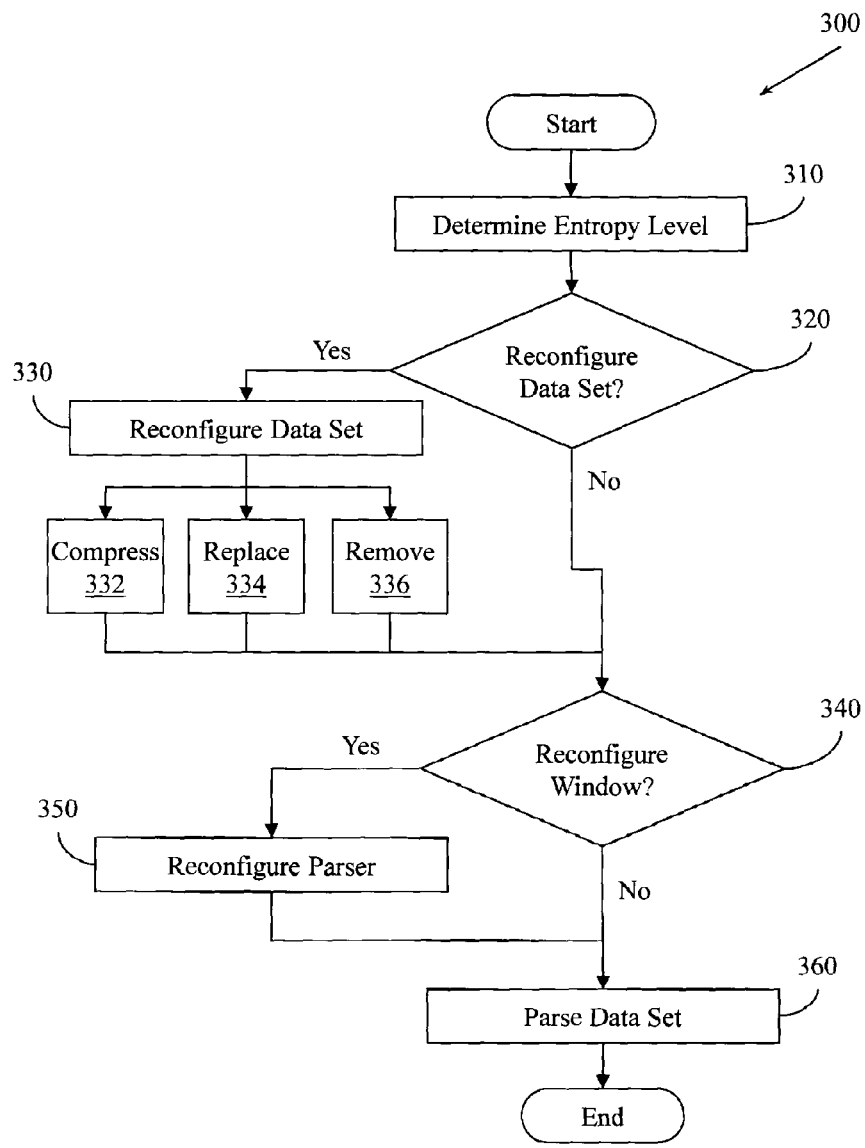
FIG. 3 illustrates a method associated with manipulating actual or effective window size in data-dependant variable-length sub-block parsing.

FIG. 3 illustrates a method 300 associated with manipulating the actual or effective window size in a data-dependant variable-length sub-block parser. Method 300 includes, at 310, identifying the entropy level for a data set presented to the parser. Entropy is a measure of uncertainty associated with the randomness of data in an object to be data reduced. The entropy of data that is truly random is one. The entropy of a long string of duplicate characters is nearly zero. The entropy of most data falls between these two limiting examples.

Method 300 also includes, at 320, making a determination concerning whether the data set is to be reconfigured. If the decision at 320 is yes, then method 300 proceeds, at 330, by selectively reconfiguring the data set. If the decision at 330 is no, then method 300 proceeds to 340. In one example, the determination at 320 is based on whether the entropy level of the data set exceeds a desired threshold.

In one example, selectively reconfiguring the data set includes increasing the information density of the data set. Increasing the density may include compressing, at 332, the data set, skipping portions of the data set, replacing, at 334, portions of the data set, removing, at 336, portions of the data set, and so on. In different embodiments, increasing the density may occur before parsing the data set or even while parsing the data set. When compression is performed, in different embodiments the compression may be performed using a lossy compression technique, an irreversible compression technique, or other compression techniques.

In different examples, increasing the information density of the data set may involve performing actions included, but not limited to, performing run length coding on the data set, identifying a known common byte sequence in the data set and replacing the known common byte sequence with replacement data in the data set, identifying a known common byte sequence in the data set and removing the known common byte sequence from the data set, performing a Huffman coding on the data set, and performing an arithmetic coding on the data set.

In one embodiment, selectively reconfiguring the data set may include selectively replacing a patterned sequence in the data set with an iterative sequence. The patterned sequence may be, for example, a repeated single byte pattern of length N, N being an integer, and a repeated multi-byte pattern occurring at least M times in the data set, M being an integer. In one embodiment, the iterative sequence may be produced by an iterative sequence function as a deterministic sequence of numbers based on an initial state. The iterative sequence function may be seeded in different ways. For example, the iterative sequence function may be seeded by previous data in the data set, by the current state of the parser, and in other ways. When seeded by the current state of the parser, in one example, the current state may depend, at least in part, on a rolling hash value used by the parser. The iterative sequence may be computed using different functions. For example, functions may include, but are not limited to, a pseudo-random number generator, a hash function, and an encryption function.

In another embodiment, selectively reconfiguring the data set may include identifying different portions of the data set. For example, a first portion(s) of the data set may include a patterned sequence(s) while a second portion(s) of the data set may not include patterned sequences. With the different portions identified, the method 300 may include controlling the parser to parse the second portion and to not parse the first portion. The first portion may be stored in ways including, but not limited to, a compacted form, and a descriptive form. The patterned sequence may be, for example, a repeated single byte pattern of length N, N being an integer or a repeated multi-byte pattern occurring at least M times, M being an integer.

Method 300 includes, at 340, making a determination concerning whether the window is to be reconfigured. If the determination at 340 is yes, then processing continues at 350 by selectively reconfiguring the data-dependent parser.

In one example, selectively reconfiguring the data-dependent parser includes determining a desired length for a variable-length window employed by the parser and setting the variable-length window to the desired length. The desired length may be computed as a function of the entropy level of the data set. Additionally, the desired length may be selected to facilitate the parser parsing the data set into a set of sub-blocks having a geometric distribution of sub-block sizes. While a geometric distribution is described, one skilled in the art will appreciate that other distributions may be desired.

Method 300 concludes, at 360, by parsing the data set.

Figure 4:
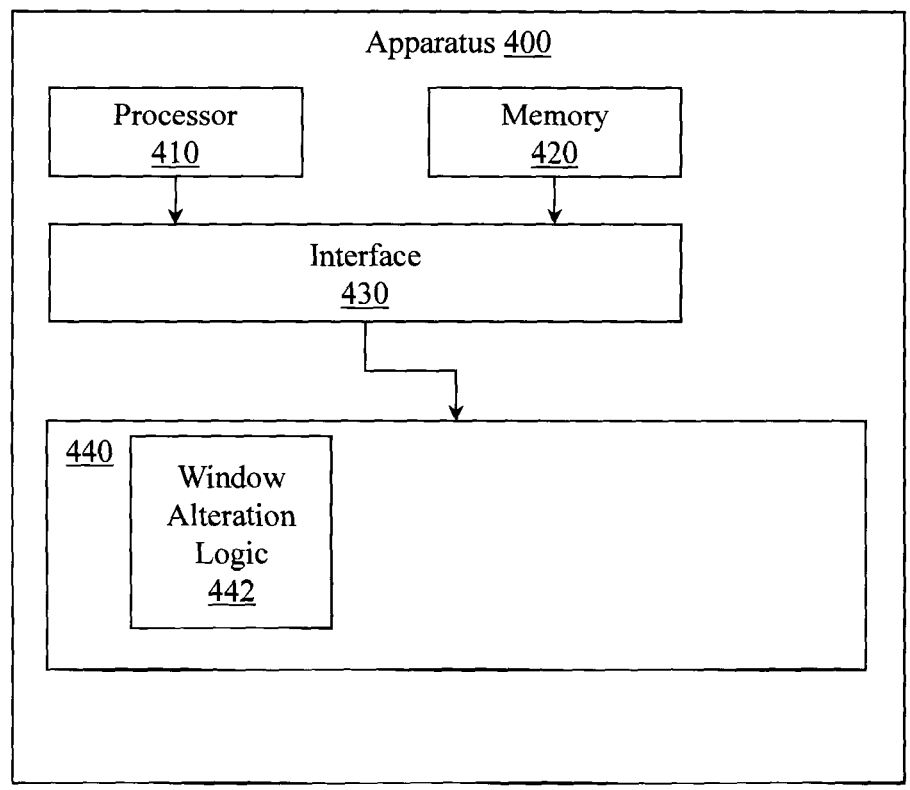
FIG. 4 illustrates an apparatus associated with manipulating actual or effective window size in data-dependant variable-length sub-block parsing.

FIG. 4 illustrates an apparatus 400 associated with manipulating the actual or effective window size in data-dependant variable-length sub-block parsing. Apparatus 400 includes a processor 410, a memory 420, a set of logics 440, and an interface 430 connecting the processor 410, the memory 420, and the set of logics 440.

The set of logics 440 includes a window alteration logic 442. Window alteration logic 442 is configured to change either the actual size of a window or the effective size of the window or both. One skilled in the art will appreciate that the window is used by a data-dependent deduplication parser to identify sub-block boundary locations in a set of data to be deduplicated.

In one embodiment, the window alteration logic 442 is configured to change the actual size of the window by determining a desired length for the window and setting the window length to that desired length. The desired length is determined as a function of the entropy level of the data set presented to the apparatus 400. In one embodiment, the desired length is selected to facilitate the parser parsing the data set into a set of sub-blocks having a desired distribution of sub-block sizes. The desired distribution may be, for example, a geometric distribution.

In one embodiment, the window alteration logic 442 is configured to change the effective size of the window by increasing the information density of the data set. Increasing the information density of the data set may involve performing actions including, but not limited to, performing run length coding on the data set, identifying a known common byte sequence in the data set and replacing the known common byte sequence with replacement data in the data set, identifying a known common byte sequence in the data set and removing the known common byte sequence from the data set, performing a Huffman coding on the data set, and performing an arithmetic coding on the data set.

In another embodiment, the window alteration logic 442 is configured to change the effective size of the window by selectively replacing a patterned sequence in the data set with an iterative sequence. The patterned sequence may be, for example, a repeated single byte pattern of length N, N being an integer, a repeated multi-byte pattern occurring at least M times, M being an integer, and so on.

In one example, a method may be implemented as computer executable instructions. Thus, in one example, a non-transitory computer readable medium may store computer executable instructions that if executed by a computer (e.g., de-duplication client) cause the computer to perform methods described herein.

Figure 5:
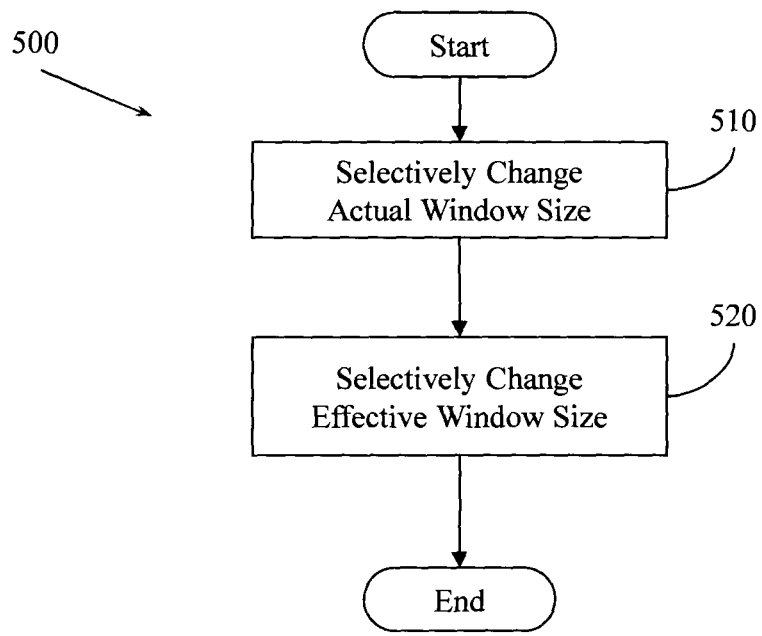
FIG. 5 illustrates a method associated with manipulating actual or effective window size in data-dependant variable-length sub-block parsing.

FIG. 5 illustrates a method 500 associated with manipulating actual or effective window size in data-dependant variable-length sub-block parsing. Instructions for method 500 may be stored on a non-transitory computer readable medium. Method 500 includes, at 510, selectively changing an actual window size based on the entropy of data presented to the data deduplication computer. Changing the actual window size may include, for example, changing a parameter in a parser, writing a value to a register, updating a memory entry, and so on. Method 500 may also include, at 520, selectively changing an effective window size based on the entropy of data presented to the data deduplication computer. Changing the effective window size may include, for example, compressing data, removing data, replacing data, and otherwise manipulating an input data set.

The data deduplication computer controlled by method 500 employs a window based approach to identify boundary locations in data presented to the data deduplication computer. The window based approach selectively identifies a boundary in the data presented to the data deduplication computer as a function of whether data in a window satisfies a constraint.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A sub-block parser configured with a variable sized window,
   where the variable sized window is used by the parser to parse a block of data into smaller sub-blocks of data by passing the variable sized window over the block of data to identify sub-block boundary locations,
   where the smaller sub-blocks of data are mutually exclusive subsets of the block of data,
   where a window location is defined by b[k−A+1 . . . k+B], b being the block of data, k being an integer, A being an integer, and B being and integer greater than A,
   and where a sub-block is defined by the location of two boundaries placed by the parser at two different window locations, where A and B vary as a function of an attribute of the block of data being parsed.

2. The sub-block parser of claim 1, where the sub-block parser increases the information density of the data block to be parsed before parsing the data block.

3. An apparatus, comprising:
   a processor;
   a memory;
   a set of logics; and
   an interface connecting the processor, the memory, and the set of logics, the set of logics comprising:
      a window alteration logic that changes the actual size of a window or the effective size of the window, the window being used by a data-dependent deduplication parser to identify sub-block boundary locations in a set of data to be deduplicated, where the window is used by the data-dependent deduplication parser to parse the set of data into smaller sub-blocks of data, where the sub-blocks of data are subsets of the set of data, and where the size of the window varies as a function of an attribute of the set of data.

4. The apparatus of claim 3, where the window alteration logic changes the actual size of the window by:
   determining a desired length for the window, where the desired length is a function of the entropy level of the data set, and where the desired length is selected to facilitate the parser parsing the data set into a set of sub-blocks having a desired distribution of sub-block sizes; and
   setting the window length to the desired length.

5. The apparatus of claim 3, where the window alteration logic changes the effective size of the window by:
   increasing the information density of the data set by performing run length coding on the data set, identifying a known common byte sequence in the data set and replacing the known common byte sequence with replacement data in the data set, identifying a known common byte sequence in the data set and removing the known common byte sequence from the data set, performing a Huffman coding on the data set, or performing an arithmetic coding on the data set.

6. The apparatus of claim 3, where the window alteration logic changes the effective size of the window by:
   selectively replacing a patterned sequence in the data set with an iterative sequence.

* * * * *

UNITED STATES PATENT AND TRADEMARK OFFICE
CERTIFICATE OF CORRECTION

PATENT NO. : 8,984,024 B2
APPLICATION NO. : 14/065319
DATED : March 17, 2015
INVENTOR(S) : Leppard Page 1 of 1

It is certified that error appears in the above-identified patent and that said Letters Patent is hereby corrected as shown below:

In the Specification:

In Column 1, line 33, delete "the '810 reads" and insert --the '810 patent reads--.

In the Claims:

In Column 9, line 27, delete "being and integer" and insert --being an integer--.

Signed and Sealed this
Eleventh Day of August, 2015

Michelle K. Lee
*Director of the United States Patent and Trademark Office*